United States Patent
Chatelain

[15] 3,683,051
[45] Aug. 8, 1972

[54] COPOLYMERS OF VINYL CHLORIDE AND LOWER OLEFINS

[72] Inventor: Jean Chatelain, Lyon, France

[73] Assignee: Produits Chimiques Pechiney Saint-Gabain, Nevilly-sur-Sein, France

[22] Filed: Feb. 25, 1969

[21] Appl. No.: 802,230

[30] Foreign Application Priority Data

March 5, 1968 France......................68142369

[52] U.S. Cl. ..........260/878 R, 260/871, 260/92.8 R, 260/378 B
[51] Int. Cl. .............................................C08f 15/00
[58] Field of Search ....................................260/878 B

[56] References Cited

UNITED STATES PATENTS

| | | | |
|---|---|---|---|
| 3,112,290 | 11/1963 | Salyer | 260/45.5 |
| 3,189,664 | 6/1965 | Nozalie | 260/881 |
| 3,254,140 | 5/1966 | Hogemeyer et al | 260/897 |
| 3,453,346 | 1/1969 | Hogemeyer et al | 260/878 |
| 3,522,227 | 1/1970 | Thomas | 260/92.8 |

*Primary Examiner*—Joseph L. Schofer
*Assistant Examiner*—Stanford M. Levin
*Attorney*—Bauer and Seymour

[57] ABSTRACT

Vinyl chloride is first polymerized in mass with high turbulent agitation to from 7 to 15 percent completion forming suspended polymer seeds in the liquid monomer, the suspension is added to a mixture of liquid vinyl chloride and low molecular weight olefin, and polymerization in mass is continued to completion, producing grains having a seed of the homopolymer of vinyl chloride surrounded by the copolymer. The first stage with high turbulence is carried out under warm conditions of usually about 50° to 60° C. and the second stage is carried out at from about −40° to +80° C. with mild agitation. The product is concentrated in a narrow range of particle sizes, e.g. 80 percent between 100 and 250 microns.

7 Claims, No Drawings

COPOLYMERS OF VINYL CHLORIDE AND LOWER OLEFINS

This invention relates to the manufacture of superior forms of polyvinyl chloride copolymers, to novel processes of making them, and to overcoming of prior difficulties in such manufacture.

It has previously been proposed by the assignee to prepare polymers (homopolymers and copolymers) of vinyl chloride by polymerization in mass (in the absence of additives except a useful quantity of catalyst) using a novel two step process in the first of which agitation of high turbulence is used and in the second very mild agitation, usually related only to the maintenance of uniform temperature in the reaction mass; in the first, high speed step the polymerization is carried to 7 to 15 percent completion, and preferably to 8–12 percent, and in the second the speed of agitation is reduced to a minimum consistent with good heat exchange between the reaction mass and the cooling medium surrounding the autoclave; the second step of polymerization proceeds to a selected end point, e.g. about 70 percent completion.

That two-stage process has proceeded to completion, to its selected end point, in a single autoclave or in apparatus having two autoclaves of which the first acts as a high speed prepolymerizer and the second as a low speed polymerizer, the reaction mass being transferred from the first to the second autoclave when 7–15 percent polymerization has been achieved, remaining in the second until polymerization has reached its selected end point.

It has also been proposed, also by the assignee, to use different catalysts in the first and second steps of the process to achieve increased efficiency and superior products.

These processes of the assignee have had great advantages, producing products of superior chemical and physical properties, which can be reproduced at will, including a granular product of which the grains are spherical and nearer to being of one size than was previously possible, prior processes of mass type producing widely dispersed sizes of irregularly shaped particles. The new products are also denser than could be produced from like ingredients by prior art methods.

While the advantages, over the prior art, of the new polymers (homopolymers and copolymers) is very great it has been discovered that difficulties have arisen in copolymerizations involving comonomers of the lower olefin class. In fact the copolymers of vinyl chloride and lower olefins obtained had too dispersed grain sizes (bad granulometry) and insufficient porosity and density.

It is an object of this invention to remedy such imperfections and to produce copolymers of vinyl chloride and lower olefines of superior properties, particularly which have excellent indexes of viscosity, good fluidity when hot, and good Vicat points.

In this patent the word "prepolymerisate" means a suspension of polymer in liquid monomer, of the type produced by the first step of a two step method above described, and the word "copolymerisate" means the product resulting from the second stage of such processes. In the present case the copolymer is a special product resulting from the growth of homopolymeric seeds of vinyl chloride obtained in the first step, with the help of a mixture of vinyl chloride and a lower olefine.

The objects of the invention are accomplished generally speaking by a copolymer of vinyl chloride and an olefinic hydrocarbon of relatively low molecular weight in grains formed from seeds of vinyl chloride homopolymer ; and by the method of forming a copolymer of vinyl chloride and a polymerizable olefine of low molecular weight which comprises polymerizing vinyl chloride in mass with agitation of high tubu-lence until a suspension of 7–15 percent polymer in liquid monomer is formed, forming a mixture of vinyl chloride and such olefine under conditions of temperature, pressure, and catalysis favorable to copolymerization, mixing the suspension with said mixture, and polymerizing the mixture.

The invention contemplates a process of preparing copolymers of vinyl chloride and lower olefinic hydrocarbons (especially those of about 2–4 C atoms) in mass by a two stage process in the first of which a homoprepolymerisate of vinyl chloride is prepared with high turbulence agitation to polyme-rization of about 7 to 15 percent and preferably from 8 to 12 percent, and in the second stage adding the prepolymerisate to a mixture of vinyl chloride and one or more olefinic hydrocarbons under conditions of pressure, temperature and catalysis favorable to each stage. Among the hydrocarbons useful as comonomers are ethylene, propylene, butene-1, butene-2 (both cis and trans), and isobutene. Such comonomers are favorably employed in amounts of 0.1 to 35 percent and preferably from 0.1 to 25 percent, the proportion being of the weight of the final product.

The process is quite flexible and wholly reproducible so that the nature of the chosen olefinic monomer, the temperature of copolymerization, the relative proportions of the comonomers, and the catalysts employed, can be used to produce products of selected index of viscosity, good workability by standard processing techniques, and excellent thermal stability.

The products of the process are granular, appearing as spherical grains in a relatively narrow band of sizes, a majority of which, at the end of a normal polymerization having an end point circa 70–72 percent polymerization will be between 100 microns and 250 microns in size. In general only a few grains, possibly 1-3 percent, will be less than 100 microns in size and over 75 percent will be under 250 microns in size. These grains have a generally copolymeric structure including a minute homopolymeric, polyvinyl chloride nucleus. They have an Afnor index of viscosity of 20 to 110.

As an example of different products which can be made by this invention from comonomers having similar contents of olefinic hydrocarbons, using like temperatures, pressures, and catalysts in the stages of the process, one copolymer was made from vinyl chloride and isobutene and another from vinyl chloride and propylene. Both copolymerizations were carried out at 50°C. upon a mixture of 85 percent vinyl chloride and 15 percent of the hydrocarbon. The index of viscosity of the isobutene copolymer, by Afnor test NF T 51013 was 26 and of the propylene copolymer 54.

In other examples copolymerization was carried out at 45°C. upon mixtures of 91 percent vinyl chloride and 9 percent propylene, 85 percent vinyl chloride and 15 percent propylene, and 77 percent vinyl chloride and 23 percent propylene. The index of viscosity of the products were respectively 80, 60, and 47 by the Afnor test.

The index of viscosity of the product was also varied at will by changing the temperature of polymerization. A mixture containing 85 percent vinyl chloride and 15 percent propylene was divided into three parts, each part was needed with identical quantities of a prepolymerisate, and each part was copolymerized at a different temperature, the first at 20°C. producing a product having an index of viscosity (Afnor) of 108, the second at 45°C. producing a product having an index of viscosity of 60, and the third at 50°C. producing a product having an index of viscosity of 54.

During the first stage of the process a temperature of the reaction mass of about 55° to 60°C. is preferred practice; during the second stage (copolymerization) any temperature from −40°C. to +80°C. appears to perform adequately.

The following examples illustrate the invention without detracting from the generality of the material elsewhere herein set forth.

EXAMPLE 1

A vertical, 200 l. prepolymerizer equipped with a turbine type agitator called a typhon, rotatable at 720 r.p.m., received 140 kg. of vinyl chloride of which 15 kg. were released to sweep out the air, and thereafter enough ethyl-hexyl peroxydicarbonate, a known catalyst for this stage of the reaction, to supply 0.625 g. of active oxygen to the polymerization. The reaction mass was heated rapidly to a temperature which established a relative internal pressure of 11.5 bars, which was maintained one hour.

A 500 l. horizontal autoclave equipped with a slow speed ribbon blender agitator was purged of air and received a charge of 75 kg. of vinyl chloride and 10.5 kg. of propylene. A catalyst system composed of 210 g. lauroyl peroxide, and enough octyl peroxydicarbonate in solution, in methyl phthalate, to provide 1.05 g. of active oxygen. The prepolymerisate was run into the charge in the second autoclave and the temperature was raised rapidly to a relative pressure of 11.5 bars while the agitator rotated at 30 r.p.m. Polymerization continued for 12½ hours after which the autoclave was vented of unreacted monomer, leaving 158 kg. of a vinyl chloride-propylene copolymer having the following granulometry:

| Screen mesh in microns | 630 | 500 | 400 | 345 | 250 | 200 | 160 | 100 |
|---|---|---|---|---|---|---|---|---|
| %fallthrough | 87 | 86 | 84 | 84 | 82 | 81 | 65 | 2 |

The product was in spherical granules in the sizes indicated, 13 percent being larger than 630 microns and 2 percent less than 100 microns. The Afnor index of viscosity was 69, and the hot fluidity was 185°C for a debit of 20 g./10 mn.. The latter measurement was obtained by use of a grader having a cylinder of 10.45 mm. diameter and a piston of 10.4 mm. The hot fluidity is measured by the temperature at which the resin must be heated to flow with a debit of 20 g./10 mn. when forced through an orifice of 2.1 mm. diameter under a pressure of 52 kg./cm2. The copolymer contained 2.5 percent propylene charge and 97.5 percent polyvinyl chloride.

EXAMPLES 2–7

The procedure of example 1 was followed in general, in these examples, but changing the olefine content and the reaction temperatures. The results are shown in the table, which also shows the granulometry of the copolymers, the percent composition of the copolymers in terms of their olefine content, the viscosity index, and hot fluidity and Vicat index.

| Ex. | Olefine | % Olefine polymerized | Temp. of copolymerization in °C. | 250μ % fallthrough | % Olefine as copolymer | Viscosity Index | Hot fluidity, °C. | Vicat Index, 1 kg. |
|---|---|---|---|---|---|---|---|---|
| 2 | Propylene | 4 | 61 | 96 | 2.4 | 72 | 186 | 92 |
| 3 | " | 5 | 61 | 96 | 2.5 | 69 | 185 | 88 |
| 4 | " | 13 | 45 | 87 | 6.2 | 64 | 167 | 77.5 |
| 5 | " | 15 | 50 | 83 | 6.8 | 60 | 152 | 74.5 |
| 6 | " | 23 | 45 | 75 | 9.6 | 47 | 134 | 68 |
| 7 | " | 10 | −15 | 95 | 3.9 | 104 | — | 95 |

In example 7 the polyvinyl chloride seeds were added cold to the second autoclave.

EXAMPLES 8–13

In these examples the foregoing procedures were followed with different olefine hydrocarbons of low molecular weight, and in one case a change of copolymerizing temperature. In example 13 the mixture contained 40 percent butene-1, 20 percent butene-2, and 2 percent isobutene.

| Ex. | Olefine | % Olefine polymerized | Temp. of copolymerization in °C. | 250μ % fallthrough | % Olefine as copolymer | Viscosity Index | Hot fluidity, °C. | Vicat Index, 1 kg. |
|---|---|---|---|---|---|---|---|---|
| 8 | Butene-1 | 1 | 72 | 96 | — | 67 | 181 | 92 |
| 9 | Butene-2 | 1 | 72 | 96 | — | 67 | 182 | 92 |
| 10 | Isobutene | 3 | 72 | 80 | 2 | 52 | 159 | 81 |
| 11 | " | 5 | 73 | 70 | 3 | 41 | — | — |
| 12 | " | 5 | −15 | 89 | 3.2 | 91 | — | 95 |
| 13 | Mixture: Butene-1 Butene-2 Isobutene | 2 | 72 | 80 | 1.1 | 60 | 173 | 86 |

The advantages of the invention are the overcoming of the problems that interfered with the use of lower olefine hydrocarbons as comonomers with vinyl chloride, the improvement of such products, and the production of better qualities in such products than were heretofore possible. The merit of the invention can be assessed by carrying out a copolymerization in the absence of this invention, then a like copolymerization using this invention. In every instance the improvements are substantial.

Further information concerning catalysts and general reaction conditions can be derived from French Pat. Nos. 1,357,736; 1,382,072; 1,436,744; and 1,450,464, and their numerous additions.

As many apparently widely different embodiments of the present invention may be made without departing from the spirit and scope thereof, it is to be understood that the invention is not limited to the specific embodiments.

What is claimed is:

1. A polymer in the form of substantially spherical grains, each grain containing a minute homopolymeric polyvinyl chloride nucleus and in situ formed copolymer of vinyl chloride with not more than 25 percent by weight of an olefinic hydrocarbon having from two to four carbon atoms.

2. A polymer according to claim 1 in which at least 70 percent by weight of the grains are of a size between 100 and 250 microns in diameter and less than 3 percent by weight of the grains are smaller than 100 microns in diameter, and the polymer blend has an Afnor index of viscosity of from 20 to 110.

3. A polymer according to claim 1 in which the olefinic hydrocarbon is selected from the group consisting of ethylene, propylene, isobutene, butene-1, butene-2 cis and butene-2 trans.

4. A copolymer of vinyl chloride and propylene which contains from 2.4 to 9.6 percent by weight of propylene and a hot fluidity index of from 134° to 186°C., a Vicat point of from 68° to 95°C. and an Afnor index of viscosity of 47 to 104, and is granular and has at least 75 percent by weight of the grains smaller than 250 microns the granules of the granular copolymer having nucleus of vinyl chloride homopolymer.

5. A polymer of vinyl chloride and isobutylene, in which the copolymer contains from 2 to 3.2 percent by weight of isobutylene, and has a hot fluidity index of 159°C., a Vicat point of 81°C. to 95°C. and an Afnor index of viscosity of 41–91, and is granular with at least 70 percent of the weight of the grains smaller than 250 microns the granules of the granular copolymer having nucleus of vinyl chloride homopolymer.

6. The method of preparing polyvinyl chloride and a copolymer of vinyl chloride which comprises polymerizing vinyl chloride in mass under conditions of temperature, pressure and catalysis favorable to polymerization, agitating the vinyl chloride with highly turbulent agitation until about 7 to 15 percent polymerization has occurred, adding to the mixture of vinyl chloride and polyvinyl chloride thus obtained, an olefinic hydrocarbon having from two to four carbon atoms, applying agitation, of relatively low turbulence, adequate to temperature control, while continuing copolymerization to an end point of at least about 70 percent conversion to polymer under conditions of temperature, pressure and catalysis favorable to polymerization, ending the polymerization and isolating the product, the weight of copolymerized olefinic hydrocarbon being from 0.1 to 25 percent by weight of copolymer.

7. The method according to claim 6 in which the temperature during turbulent agitation is about 55° to 60°C. and the temperature during agitation of low turbulence is from about −40° to +80°C.

* * * * *

UNITED STATES PATENT OFFICE
CERTIFICATE OF CORRECTION

Patent No. 3,683,051     Dated August 8, 1972

Inventor(s) Jean Chatelain

It is certified that error appears in the above-identified patent and that said Letters Patent are hereby corrected as shown below:

Title Page, Column 1, "[73]", line 2, change "Gabain, Nevilly-sur-Sein," to -- Gobain, Neuilly-sur-Seine, --

Signed and sealed this 6th day of March 1973.

(SEAL)
Attest:

EDWARD M. FLETCHER, JR.
Attesting Officer

ROBERT GOTTSCHALK
Commissioner of Patents